(12) United States Patent
Mazahir

(10) Patent No.: US 9,736,256 B2
(45) Date of Patent: Aug. 15, 2017

(54) IMPLEMENTING SERVER PUSH AT SERVER STACK

(71) Applicant: Microsoft Technology Licensing, LLC, Redmond, WA (US)

(72) Inventor: Osama Mazahir, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 511 days.

(21) Appl. No.: 14/180,231

(22) Filed: Feb. 13, 2014

(65) Prior Publication Data

US 2015/0229731 A1    Aug. 13, 2015

(51) Int. Cl.
*G06F 15/16* (2006.01)
*H04L 29/08* (2006.01)
*H04L 12/911* (2013.01)

(52) U.S. Cl.
CPC .............. *H04L 67/26* (2013.01); *H04L 47/70* (2013.01); *H04L 67/10* (2013.01)

(58) Field of Classification Search
CPC .......... H04L 67/26; H04L 47/70; H04L 67/10
USPC ................................................. 709/203, 223
See application file for complete search history.

(56) References Cited

U.S. PATENT DOCUMENTS

| | | |
|---|---|---|
| 6,311,206 B1 | 10/2001 | Malkin et al. |
| 6,742,127 B2 | 5/2004 | Fox et al. |
| 8,260,864 B2 | 9/2012 | Sana et al. |
| 2003/0072451 A1* | 4/2003 | Pimentel ................. H04L 63/08 380/270 |
| 2004/0215717 A1 | 10/2004 | Seifert et al. |
| 2006/0129676 A1* | 6/2006 | Modi ................. H04L 29/12009 709/227 |
| 2006/0143568 A1 | 6/2006 | Milener et al. |
| 2007/0156845 A1 | 7/2007 | Devanneaux et al. |
| 2008/0235239 A1 | 9/2008 | Penton et al. |
| 2009/0204666 A1* | 8/2009 | Sana ....................... H04L 67/26 709/203 |
| 2009/0240807 A1 | 9/2009 | Munson et al. |
| 2010/0162126 A1 | 6/2010 | Donaldson et al. |
| 2011/0307933 A1 | 12/2011 | Gavita et al. |
| 2012/0136926 A1 | 5/2012 | Dillon |
| 2012/0278886 A1 | 11/2012 | Luna |
| 2013/0110997 A1 | 5/2013 | Burckart et al. |

(Continued)

FOREIGN PATENT DOCUMENTS

| | | |
|---|---|---|
| EP | 2501110 A2 | 9/2012 |
| EP | 2533157 A2 | 12/2012 |
| WO | 2007102165 A2 | 9/2007 |

OTHER PUBLICATIONS

"International Search Report and Written Opinion Issued in PCT Application No. PCT/US2015/014948", May 4, 2015, 11 Pages.

(Continued)

*Primary Examiner* — Philip B Tran
(74) *Attorney, Agent, or Firm* — Wade IP Law LLC

(57) ABSTRACT

In one embodiment, a server 120 may push linked resources 320 to a client device 110 using the server stack 124. The server stack 124 may detect a linked resource 320 associated with an active initial navigation request 402. The server stack 124 may generate a synthetic linked resource request 506. The server stack 124 may propagate the synthetic linked resource request 506 through the server stack 124.

20 Claims, 10 Drawing Sheets

(56) References Cited

U.S. PATENT DOCUMENTS

| | | | | |
|---|---|---|---|---|
| 2013/0111500 | A1* | 5/2013 | Dixon | G06F 9/546 |
| | | | | 719/314 |
| 2013/0144954 | A1* | 6/2013 | Li | H04L 67/28 |
| | | | | 709/205 |
| 2015/0019674 | A1* | 1/2015 | Le Van Gong | H04L 67/2852 |
| | | | | 709/213 |
| 2015/0081850 | A1* | 3/2015 | Mittal | H04L 69/24 |
| | | | | 709/219 |
| 2015/0229730 | A1 | 8/2015 | Loewenthal et al. | |

OTHER PUBLICATIONS

Grigorik, Lya, "Innovating with HTTP 2.0 Server Push", Retrieved at <<http://www.igvita.com/2013/06/12/innovating-with-http-2.0-server-push/>>, Jun. 12, 2013, 4 pages.

"Server Push and Server Hints", Retrieved at <<http://www.chromium.org/spdy/link-headers-and-server-hint>>, Mar. 13, 2011, 2 pages.

Monthenegro, Gabriel, "Some Thoughts on Server Push and Client Pull", Retrieved at: <<http://lists.w3.org/Archives/Public/ietf-http-wg/2012AprJun/0494.html>>, Jun. 7, 2012, 3 pages.

"General Best Practices", Retrieved at <<http://code.google.com/p/mod-spdy/wiki/OptimizingForSpdy>>, Sep. 11, 2012, 2 pages.

"SPDY Protocol—Draft 2", Retrieved at <<http://www.chromium.org/spdy/spdy-protocol/spdy-protocol-draft2>>, Feb. 17, 2010, 15 pages.

Tang, et al., "Intelligent Browser Initiated Server Pushing", in Proceeding of the IEEE International Performance, Computing, and Communications Conference, Feb. 2000, 7 pages.

Elhassan, "Internet Explorer 11 Support SPDY Protocol", Retrieved at <<http://www.windowsbleu.com/2013/04/internet-explorer-11-supporting-spdy.html>>, Mar. 12, 2013, 3 pages.

Loreto, et al., "Known Issues and Best Practices for the Use of Long Polling and Streaming in Bidirectional HTTP", Retrieved at <<http://www.hjp.at/doc/rfc/rfc6202.html>>, Apr. 2011, 20 pages.

Deolasee, et al. "Adaptive Push-Pull: Disseminating Dynamic Web Data", in Proceedings of the 10th International Conference on World Wide Web, May 1, 2001, 10 pages.

"Second Written Opinion Issued in PCT Application No. PCT/US2015/015743", dated Jan. 13, 2016, 7 Pages.

"International Search Report and Written Opinion Issued in PCT Application No. PCT/US2015/015743", dated Sep. 14, 2015, 17 Pages.

Belshe, et al., "Hypertext Transfer Protocol version 2.0; draft-ieff-httpbis-http2-08.txt", In HTTPbis Working Group, Internet-Draft, Intended Status: Standard Track, Nov. 11, 2013, 62 Pages.

Belshe, et al., "SPDY Protocol; draft-ieff-httpbis-http2-08.txt", In HTTPbis Working Group, Internet-Draft, Nov. 28, 2012, 46 Pages.

Grigorik, Ilya, "Making the web faster with HTTP 2.0", In Communications of the ACM, vol. 56, Issue 12, Dec. 2013, pp. 42-49.

"Non-Final Office Action Issued in U.S. Appl. No. 14/180,199", dated Apr. 17, 2015, 11 pages.

"Response to Office Action Issued in U.S. Appl. No. 14/180,199", dated Jul. 17, 2015, 9 pages.

"Final Office Action Issued in U.S. Appl. No. 14/180,199", dated Aug. 7, 2015, 12 pages.

"Response to Final Office Action Issued in U.S. Appl. No. 14/180,199", dated Oct. 7, 2015, 10 pages.

"Advisory Action Issued in U.S. Appl. No. 14/180,199", dated Oct. 27, 2015, 3 pages.

"Amendment with RCE Filed in U.S. Appl. No. 14/180,199", dated Nov. 30, 2015, 10 pages.

"Non-Final Office Action Issued in U.S. Appl. No. 14/180,199", dated Feb. 2, 2016, 14 pages.

"Response to Office Action Issued in U.S. Appl. No. 14/180,199", dated Jun. 2, 2016, 11 pages.

"Final Office Action Issued in U.S. Appl. No. 14/180,199", dated Jul. 18, 2016, 19 pages.

"Amendment with RCE Filed in U.S. Appl. No. 14/180,199", dated Jan. 18, 2017, 13 pages.

"Non-Final Office Action Issued in U.S. Appl. No. 14/180,199", dated Feb. 7, 2017, 15 pages.

* cited by examiner

500

IMPLEMENTING SERVER PUSH AT SERVER STACK

BACKGROUND

A client device may connect to a server over a network data connection, such as the internet. A user agent resident on the client device may access a data resource, such as a web page, managed by a server application resident on the server. The user agent may request the server application to send the data resource to the user agent. The data resource may link to a set of one or more sub-resources, such as a script file, an image file, a video file, an audio file, an applet, or other sub-resources. The user agent may discover these linked resources upon parsing the main resource. The user agent may then request each of the linked resources from the server application. The server application may then send each linked resource as a linked resource request is received.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a server pushing linked resources to a client device using the server stack. The server stack may detect a linked resource associated with an active initial navigation request. The server stack may generate a synthetic linked resource request. The server stack may propagate the synthetic linked resource request through the server stack.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 4A:
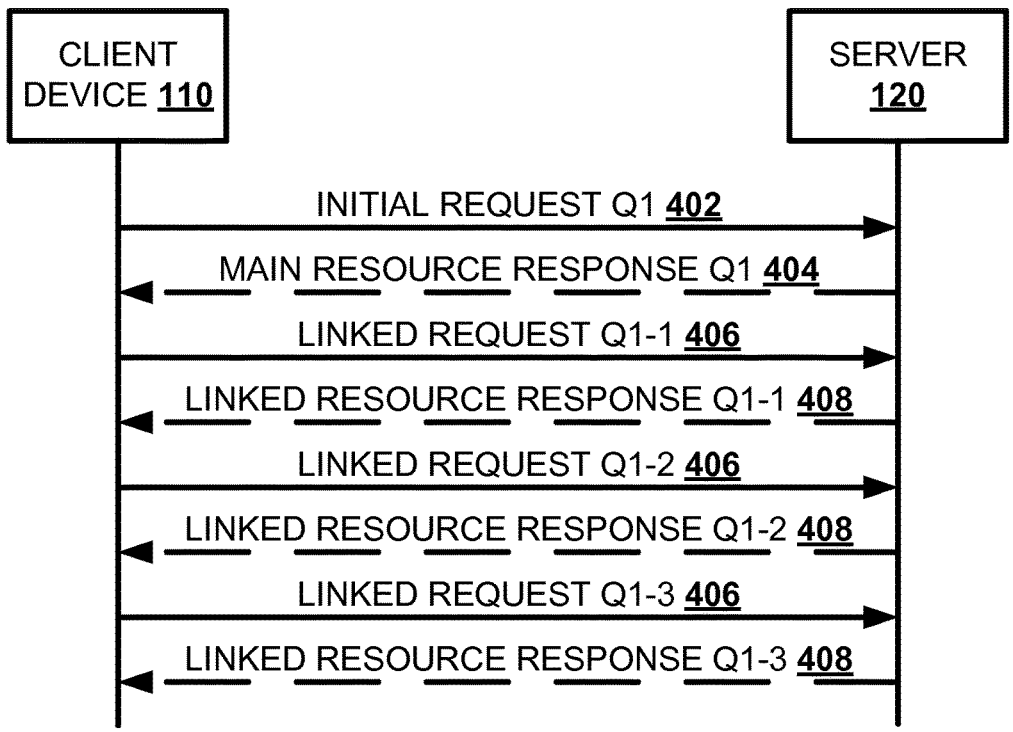
Figure 4B:
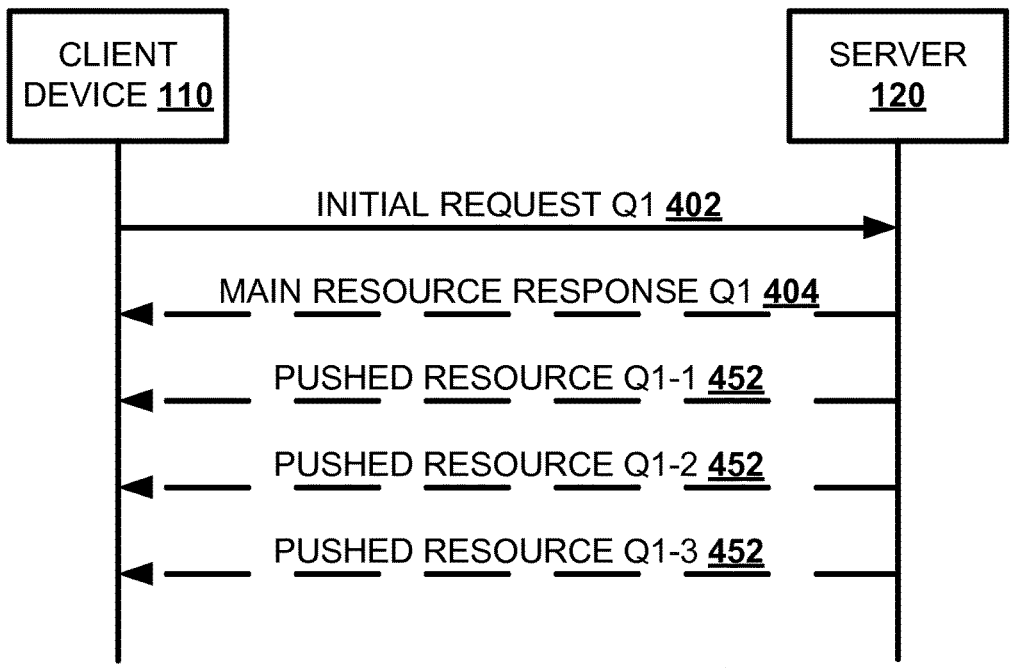

FIGS. 4a-b illustrate, in a flow diagram, embodiments of a linked resource transference.

Figure 5:
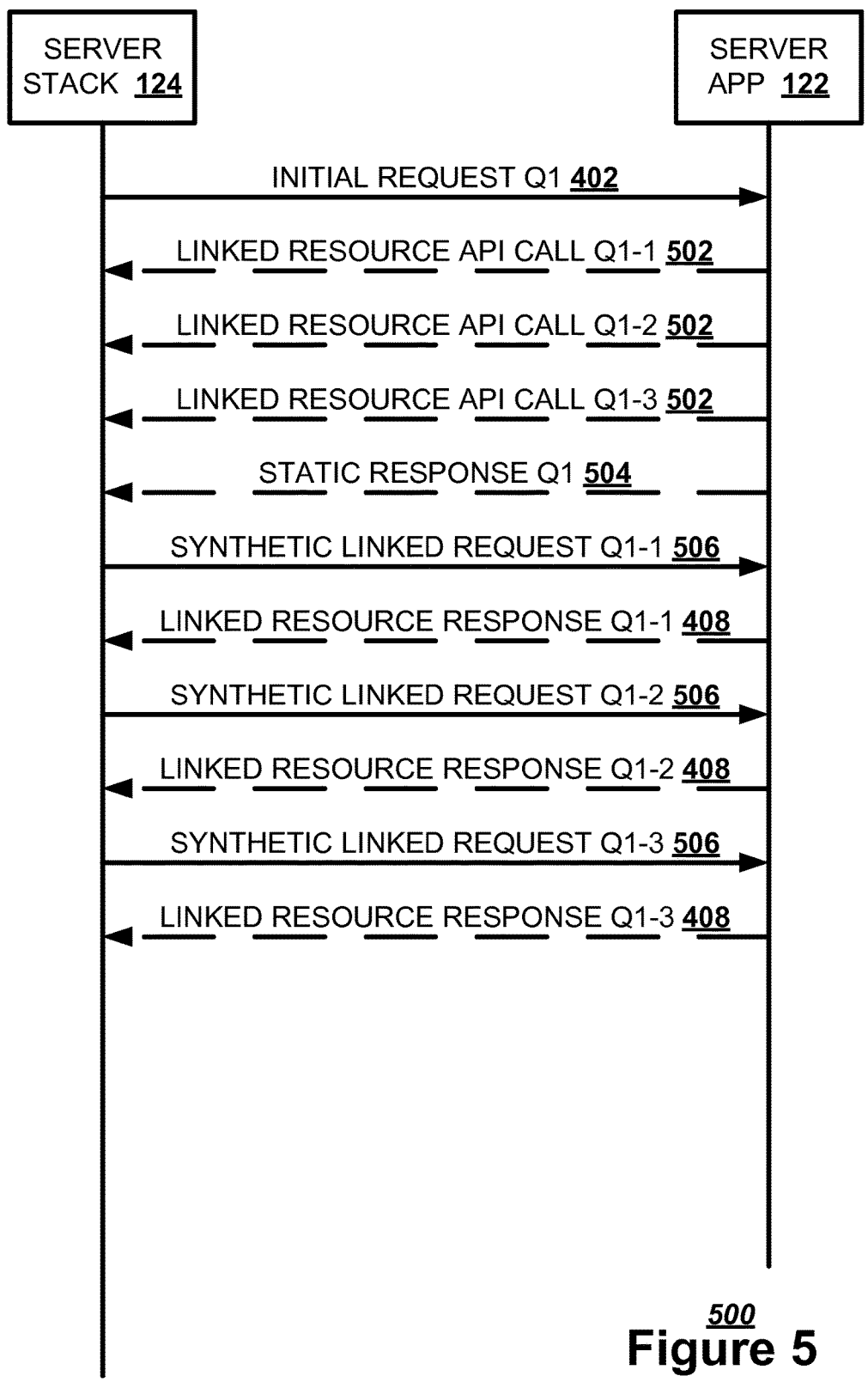

FIG. 5 illustrates, in a flow diagram, one embodiment of a static server push sequence.

Figure 6:
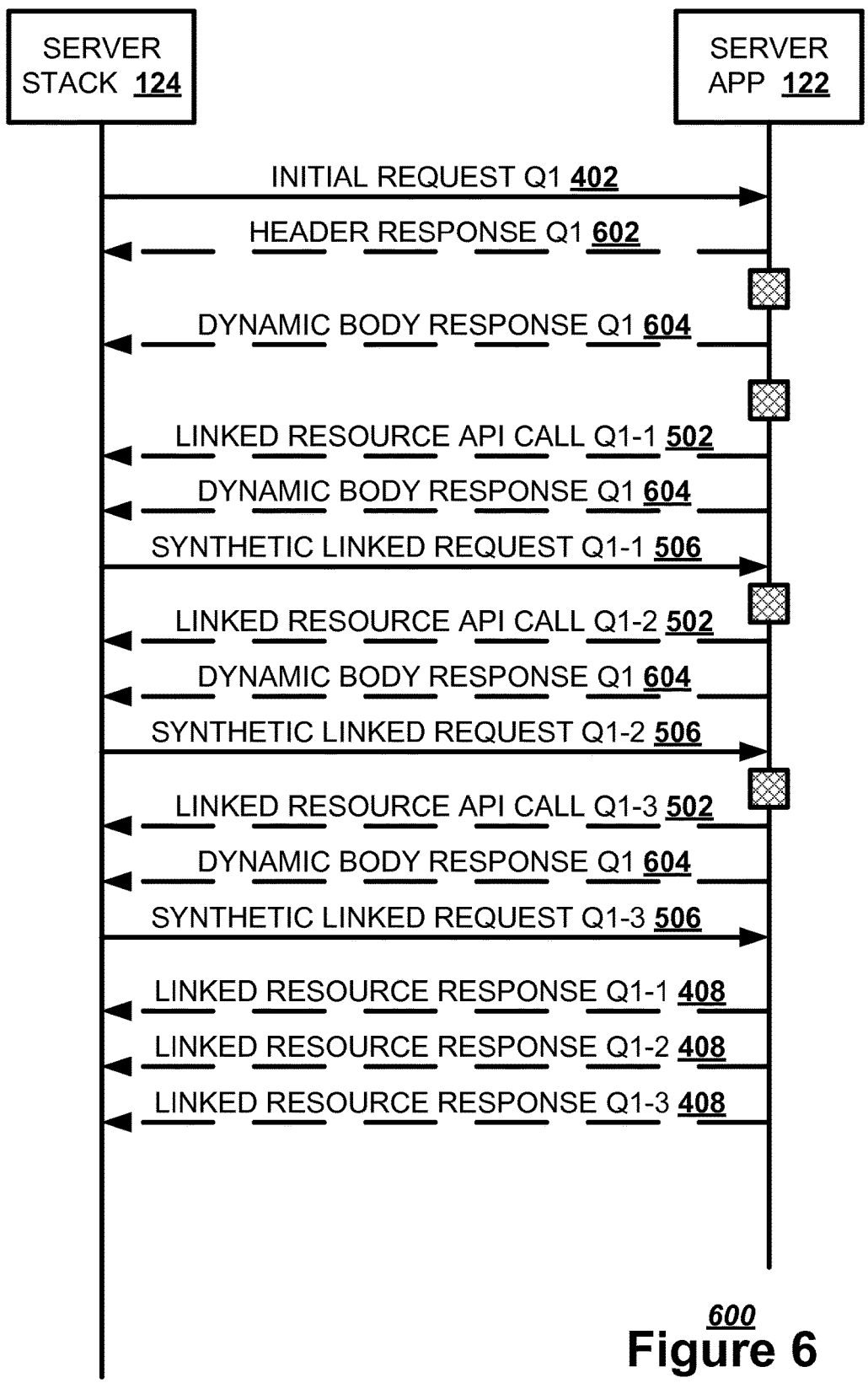

FIG. 6 illustrates, in a flow diagram, one embodiment of a dynamic server push sequence.

Figure 7:
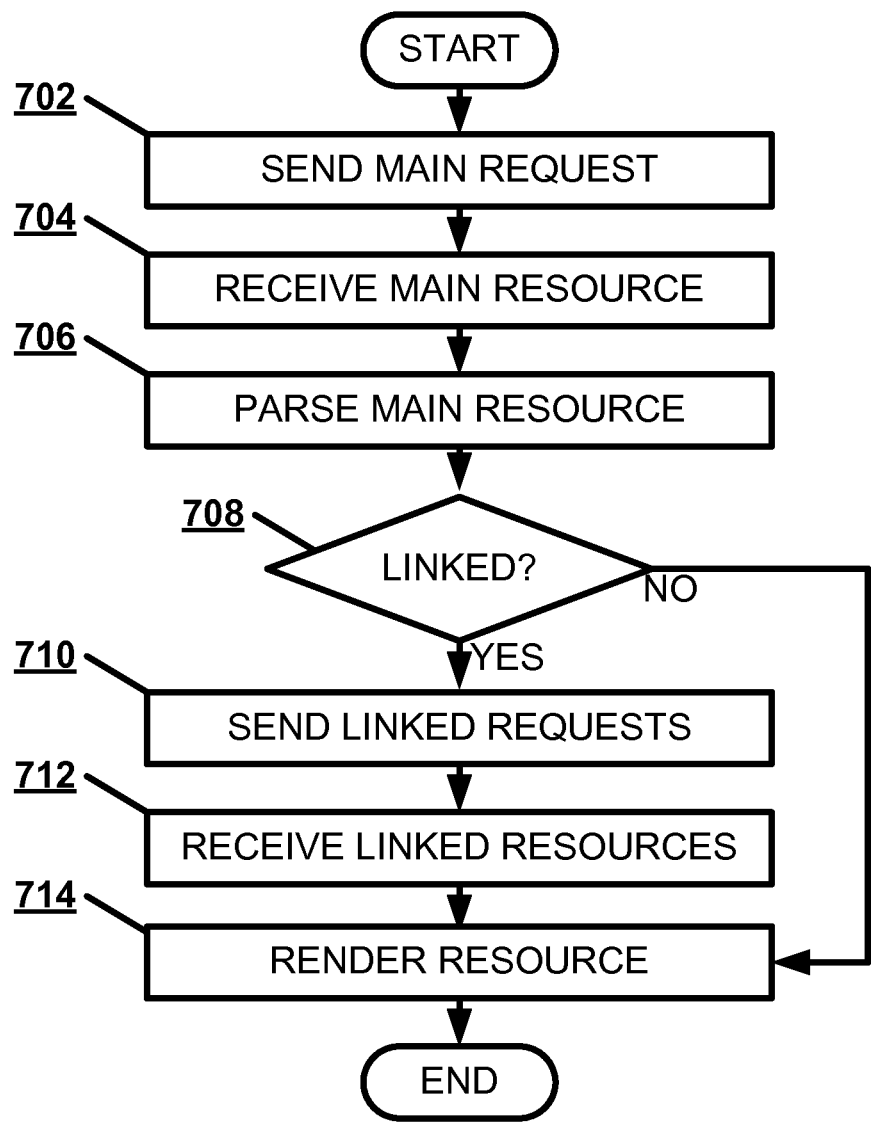

FIG. 7 illustrates, in a flow chart, one embodiment of a method of downloading a data resource with linked resources by a user agent.

Figure 8:
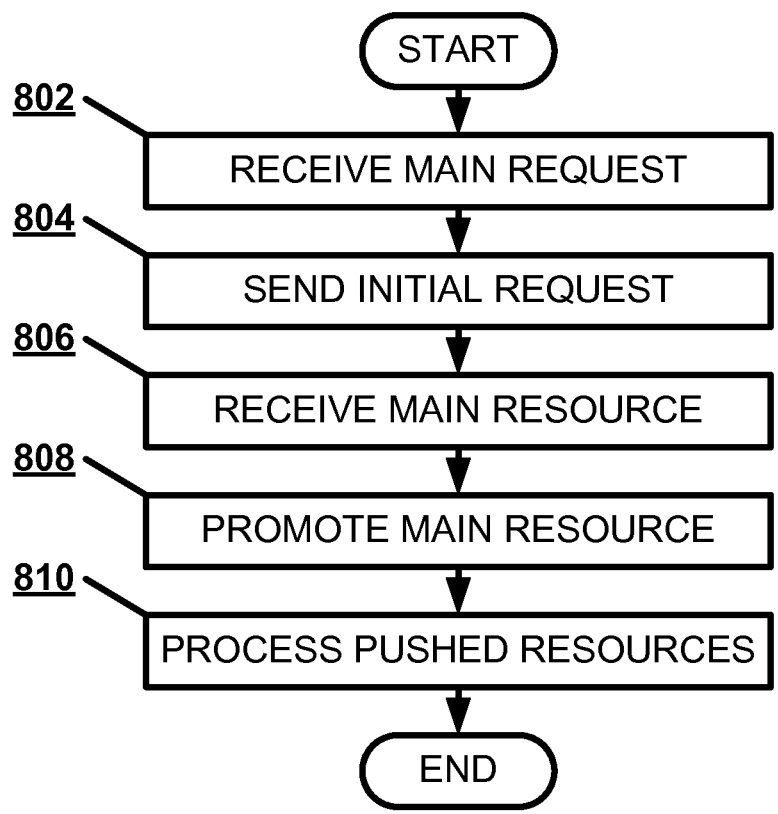

FIG. 8 illustrates, in a flow chart, one embodiment of a method of downloading a main resource and linked resource by a client stack.

Figure 9:
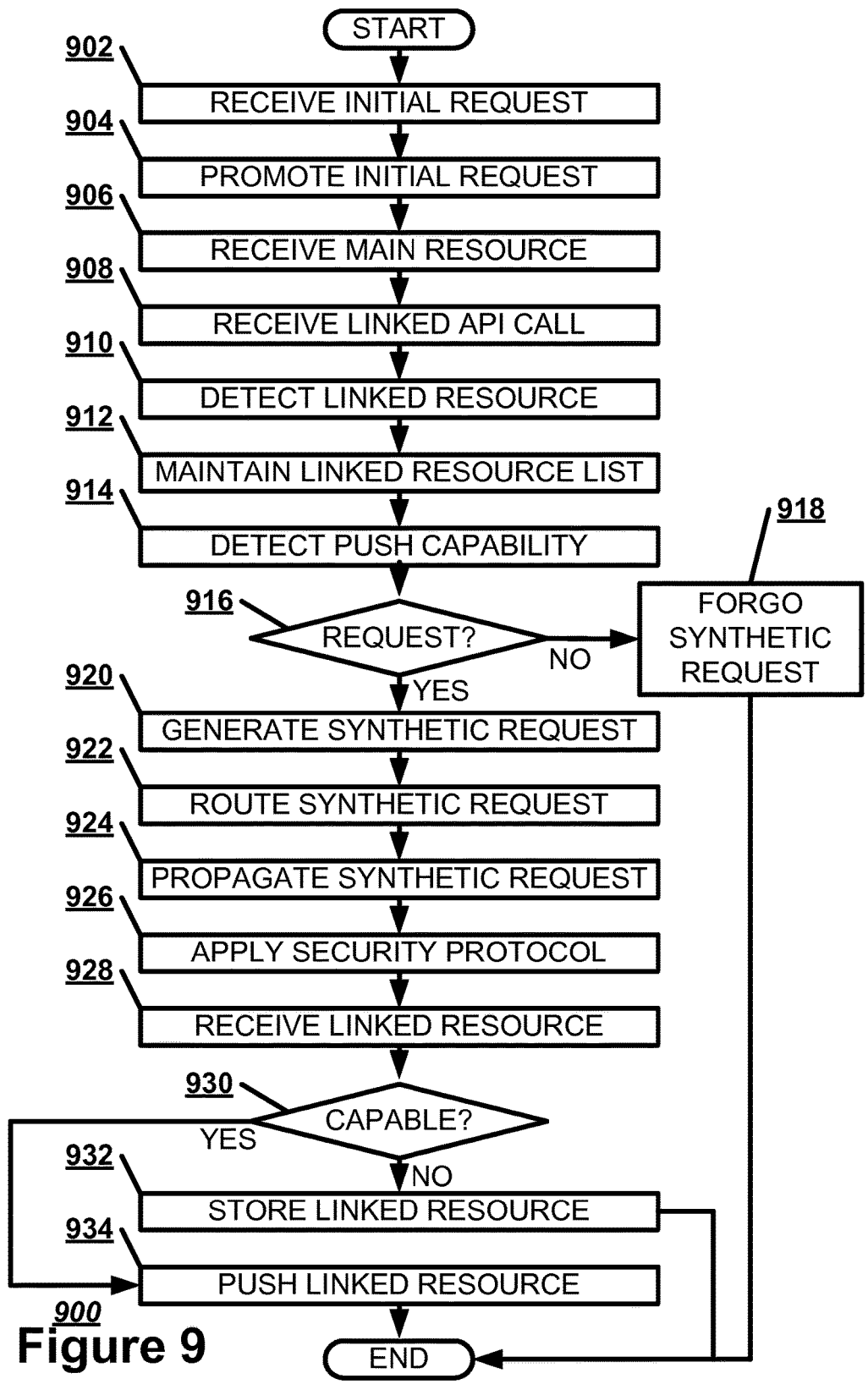

FIG. 9 illustrates, in a flow chart, one embodiment of a method of sending a main resource with linked resources by a server stack.

Figure 10:
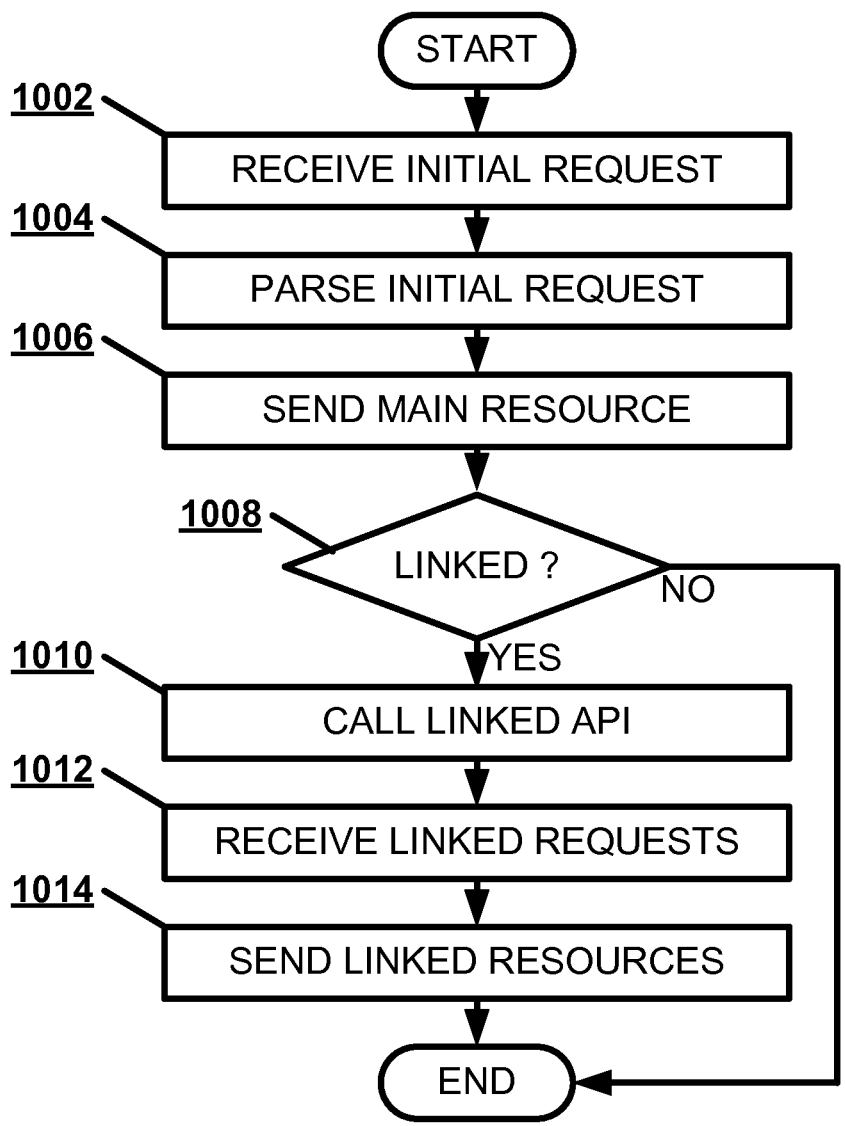

FIG. 10 illustrates, in a flow chart, one embodiment of a method of sending a main resource with linked resources by a server application.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, a client device or a server.

As an alternative to the client device puffing the data resource stored on the server by using the request-response approach, the server may proactively send a linked resource to a client device that has begun a navigation of that server without waiting for a request using a "push" protocol, such as hypertext transfer protocol (HTTP) 2.0. A push protocol is a protocol that allows a server to send a linked resource to a client device without a request for that linked resource from the client device. To prevent arbitrary or malicious data to be inserted in place of these "pushed" resources, the client stack that allows the client device to connect to the network may institute a protocol to handle any malicious data. The client device or the server may be configured at the stack level so that a user agent operating on the client device or a server application operating on the server may be agnostic as to whether the client device or server is executing a request-response protocol or a push protocol. Alternately, a server configured for push protocol at the stack level may interact with a client device operating the push protocol at the user agent. Further, a server configured for push protocol at the stack level may interact with a client device operating request-response protocol.

On the server side, a server application may use a linked resource application programming interface call to alert a server stack that a linked resource is available. The server stack in turn may take this declaration, and, based on the server state and configuration and the client's information, may generate a synthetic linked resource request at a layer of the server stack, such as the kernel mode driver. The synthetic linked resource request is a request for the linked resource originating with the server stack generated without first receiving a request from the client device. The server stack may propagate the synthetic linked resource request through to a server application, including each kernel mode sub layer, as if the request was received from the client device. As a result, the server side components and applications may work on the request just as if the client had issued the request. Further, by routing the synthetic linked resource request through the server stack, the server may apply the normal security protocols to ensure the authorized server application for that resource is handling that synthetic linked resource request.

This approach may allow the server application to focus on the intelligence of deciding which resource to push while the server stack handles the push mechanics. In turn, the server applications, as well as any third party server applications, may benefit from server push without a rewrite of the application beyond adding the linked resource application programming interface call.

Thus, in one embodiment, a server may push linked resources to a client device using the server stack. The server stack may receive an active initial navigation request from a client device. The server stack may promote the active initial navigation request to a server application. The server stack may receive a linked resource application programming interface call indicating a linked resource associated with the active initial navigation request. The server stack may detect a linked resource associated with an active initial navigation request. The server stack may generate a synthetic linked resource request. The server stack may propagate the synthetic linked resource request through the server stack.

Figure 1:
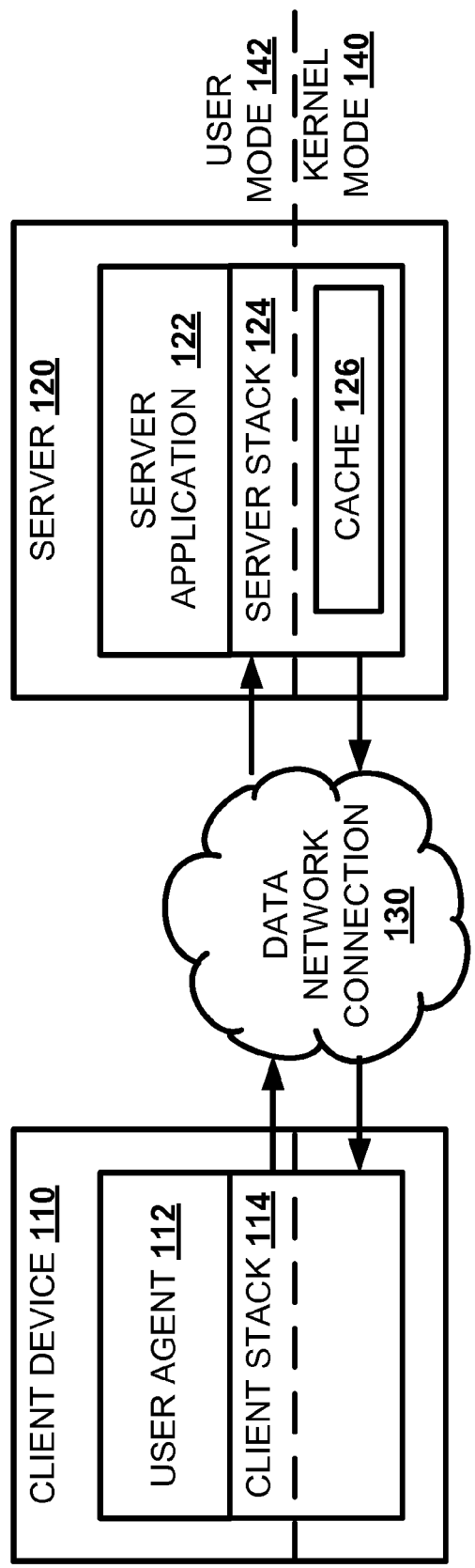
FIG. 1 illustrates, in a block diagram, one embodiment of a data network.

FIG. 1 illustrates, in a block diagram, one embodiment of a data network 100. A client device 110 may connect to a server 120 via a data network connection 130. The server 120 may refer to a single server or a distributed set of servers that that manage one or more data resources. Alternately, a peer in a peer-to-peer network may perform as the server 120 with the computing device 110. The data network connection 130 may be an internet connection, a wide area network connection, a local area network connection, or other type of data network connections.

The client device 110 may execute a user agent 112 using a client stack 114. The user agent 112 is a software application that allows a user to access and manage data resources on a different device over a data network. The client stack 114 is a set of software applications that manage the use of hardware resources by the user agent 112 to connect with other devices over the data network. The client stack 114 may operate in the kernel mode 140, with operating system level privileges, or in the user mode 142, with application level privileges.

The server 120 may execute a server application 122 using a server stack 124. The server application 122 is a software application that controls and manages data resources accessible by different device over a data network. The server stack 124 is a set of software applications that manage the use of hardware resources by the server application 122 to connect with other devices over the data network. A server stack may operate in the kernel mode 140, with the kernel mode driver acting as a server stack 124, or in the user mode 142. The kernel mode driver 126 is a driver that operates in the kernel mode, or at operating system level privilege on the server 120. The server stack 124 may control a server stack cache 126 for storing data to be sent or received over the data network. The server stack cache 126 may be a separate cache or a portion of a general cache assigned to the server stack 124.

Figure 2:
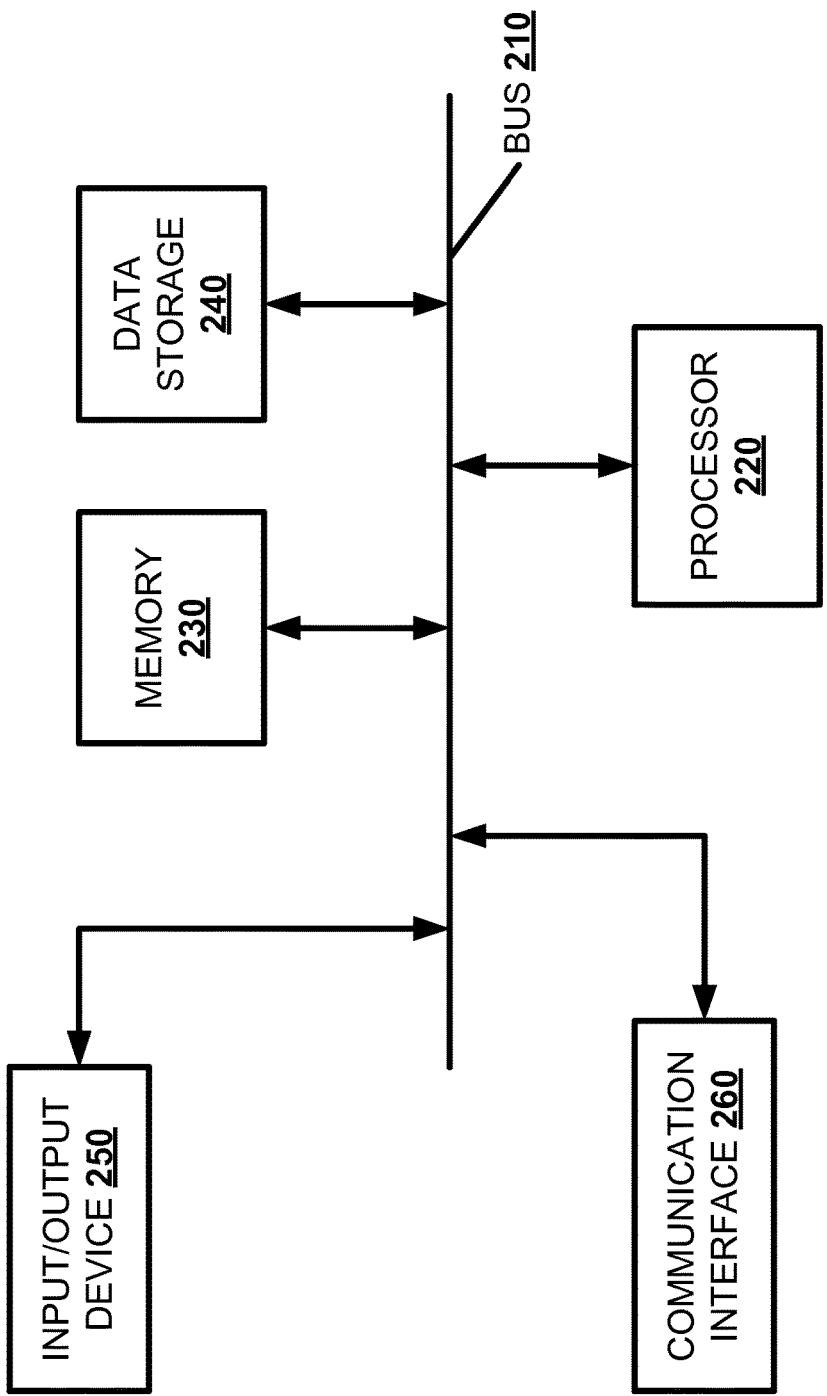
FIG. 2 illustrates, in a block diagram, one embodiment of a computing device.

FIG. 2 illustrates a block diagram of an exemplary computing device 200 which may act as a client device 110 and a server 120. The computing device 200 may combine one or more of hardware, software, firmware, and system-on-a-chip technology to implement a client device 110 and a server 120. The computing device 200 may include a bus 210, a processor 220, a memory 230, a data storage 240, an input/output device 250, and a communication interface 260. The bus 210, or other component interconnection, may permit communication among the components of the computing device 200.

The processor 220 may include at least one conventional processor or microprocessor that interprets and executes a set of instructions. The memory 230 may be a random access memory (RAM) or another type of dynamic, or volatile, data storage that stores information and instructions for execution by the processor 220. The memory 230 may also store temporary variables or other intermediate information used during execution of instructions by the processor 220. The data storage 240 may include a conventional ROM device or another type of static, or persistent, data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing data resources and linked resources.

The input/output device 250 may include one or more conventional mechanisms that permit a user to input information to the computing device 200, such as a keyboard, a mouse, a voice recognition device, a microphone, a headset, a gesture recognition device, a touch screen, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may include a network interface or a transceiver interface. The communication interface 260 may be a wireless, wired, or optical interface.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
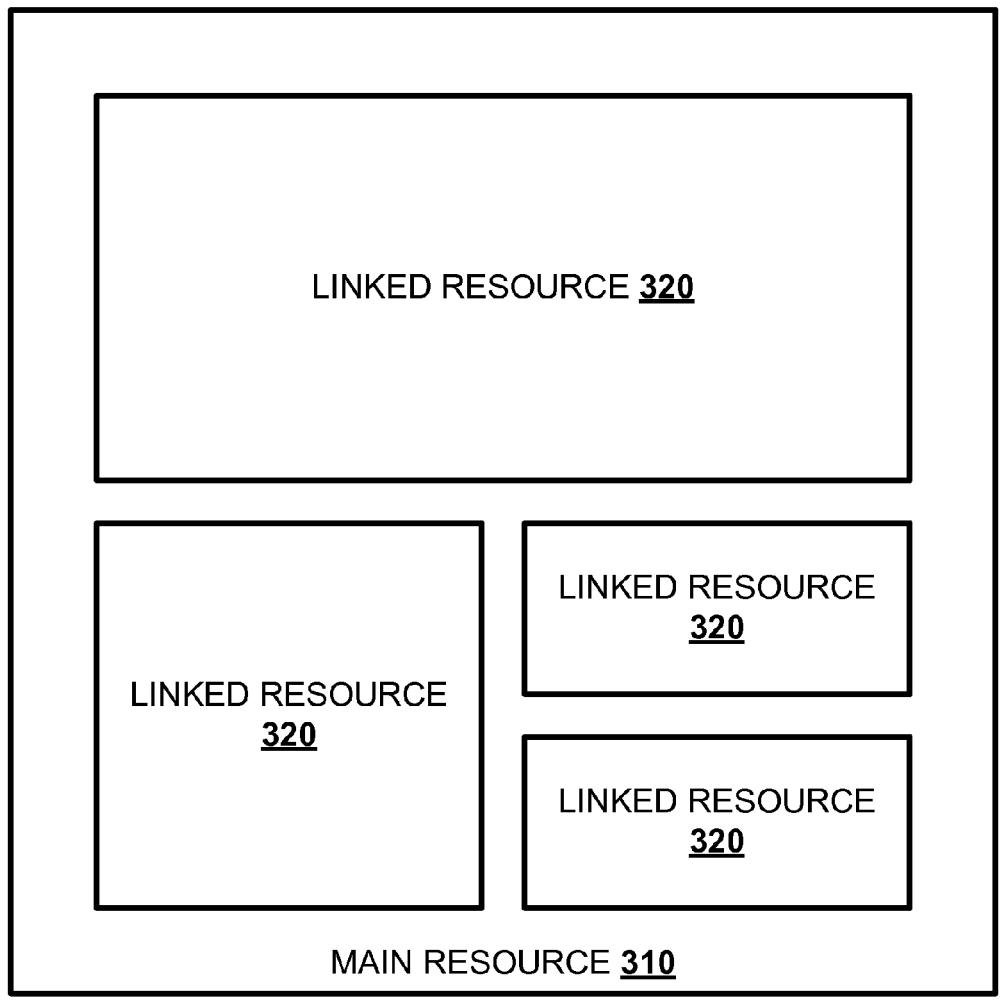
FIG. 3 illustrates, in a block diagram, one embodiment of a linked resource structure.

FIG. 3 illustrates, in a block diagram, one embodiment of a linked resource structure 300. A server application 122 may control a main resource 310 that a client device 110 may seek to access. The main resource 310 may be a web page or other data support structure. The main resource 310 may be a static resource that does not change between receiving an access request and sending the main resource 310. Alternately, the main resource 310 may be a dynamic resource that is built between receiving an access request and sending the main resource 310. The server 120 may send the dynamic resource in parts as the dynamic resource is built.

The main resource 310 may reference other resources that may be controlled by the server application 122 controlling the main resource 310 or other server applications 122, referred to as a linked resource 320. The linked resource 320 may be present on the same server 120 as the main resource 310 or on an alternate server 120. The linked resource 320 may be a script file, an image file, a video file, an audio file, an applet, a different web page, or other sub-resources.

Previously, a client device 110 seeking to acquire a main resource 310 with linked resources 320 may acquire those resources using a request-response protocol. FIG. 4a illustrates, in a flow diagram, one embodiment of a request-response protocol access 400. A client device 110 may send an initial navigation request 402 to a server 120. The server 120 may send a main resource 310 in a main resource response 404 to the client device 110. The main resource response 404 may have one or more headers and an entity body containing the main resource 310. The main resource response 404 may have an indication that the main resource 310 has one or more linked resources 320. The client device 110 may send a linked resource request 406 to the server 120 for each linked resource 320. The server 120 may reply to each linked resource request 406 by sending the linked resource 320 in a linked resource response 408 to the client device 110.

Alternately, the client device 110 may acquire the linked resource 320 of a main resource 310 using a push protocol. FIG. 4b illustrates, in a flow diagram, one embodiment of a push protocol access 450. A client device 110 may send an initial navigation request 402 to a server 120. The server 120 may send a main resource 310 in a main resource response 404 to the client device 110. The server 120 may determine that the main resource 310 has one or more linked resources 320. The server 120 may send each linked resource 320 as a pushed resource 452 to the client device 110.

On the server side, the server 120 may be configured to send linked resources to the client device 110 using a push protocol at the server stack 124. FIG. 5 illustrates, in a flow diagram, one embodiment of a static server push sequence 500. In a static server push sequence 500, the server application 122 may identify the linked resources 320 prior to building a response. The server stack 124 may send an initial navigation request 402 to the server application 122. The server application 122 may declare one or more linked resources 320 to the server stack 124 by using a linked resource application programming interface (API) call 502. The server stack 124 may maintain a linked resource list in the server stack cache 126 based on the linked resource application programming interface calls 502. The server application 122 may send a static resource response 504 to the server stack 124. The static resource response 504 may have one or more headers and an entity body containing the main resource 310. The server stack 124 may send a synthetic linked resource request 506 to the server application 122 for each linked resource 320. The server application 122 may reply to the linked resource request 506 by sending a linked resource response 408 to the server stack 124.

FIG. 6 illustrates, in a flow diagram, one embodiment of a dynamic server push sequence 600. In a dynamic server push sequence 600, the server application 122 may identify the linked resources 320 while building a response. The server stack 124 may send an initial navigation request 602 to the server application 122. The server application 122 may send a dynamic header response 602 to the server stack 124. The dynamic header response 602 may indicate the parameters of the dynamic resource to follow. The server application 122 may send a dynamic body response 604 to the server stack 124. The dynamic body response 604 may contain portions of the main resource 310 being sent. The server application 122 may declare one or more linked resources 320 to the server stack 124 by using a linked resource application programming interface (API) call 502. The server stack 124 may build a linked resource list as each linked resource application programming interface call 502 is received. The server application 122 may send the next dynamic body response 604 to the server stack 124. The server stack 124 may send a synthetic linked resource request 506 to the server application 122 for each linked resource 320. The server application 122 may reply to the linked resource request 506 by sending a linked resource response 408 to the server stack 124.

FIG. 7 illustrates, in a flow chart, one embodiment of a method 700 of downloading a data resource with linked resources 320 by a user agent 112. The user agent 112 may send a main resource request to the client stack 114 (Block 702). The user agent 112 may receive the main resource 310 from the client stack 114 (Block 704). The user agent 112 may parse the main resource 310 (Block 706). If the user agent identifies one or more linked resources 320 when parsing the main resource 310 (Block 708), the user agent 112 may send a linked resource request 406 for each linked resource 320 (Block 710). The user agent 112 may receive the linked resources 320 from the client stack 114 (Block 712). The user agent 112 may then render the completed resource, such as by presenting a website (Block 714).

FIG. 8 illustrates, in a flow chart, one embodiment of a method 800 of downloading a main resource 310 by a client stack 114. The client stack 114 may receive a main resource request from the user agent 112 (Block 802). The client stack 114 may send an initial navigation request 402 to a server 120 to initiate a navigation of the server (Block 804). The client stack 114 may receive a main resource 310 in response to the initial navigation request 402 (Block 806). The client stack 114 may promote the main resource 310 to the user agent 112 (Block 808). The client stack 114 may process any pushed resources 452 that arrive as part of the server navigation (Block 810). Alternately, for a client device 110 executing a request-response protocol, the client stack 114 may acquire any linked resources 320 using a linked resource request 406.

FIG. 9 illustrates, in a flow chart, one embodiment of a method 900 of sending a data resource with linked resources 320 by a server stack 124. The server stack 124 may receive an active initial navigation request 402 from the client device 110 (Block 902). The server stack 124 may promote the active initial navigation request 402 to a server application 122 (Block 904). The server stack may receive a main resource 310, either a dynamic resource or a static resource, from the server application 122 in response to the active initial navigation request 402 (Block 906).

The server stack 124 may receive a linked resource application programming interface (API) call 502 indicating a linked resource 320 associated with the active initial navigation request (Block 908). The server stack 124 may detect a linked resource 320 associated with the active initial navigation request (Block 910). The server stack 124 may maintain a linked resource list in the server stack cache 126 (Block 912). The server stack 124 may detect the push capability for the client device 110 (Block 914). If the client device 110 does not have push capability and the server stack 124 decides not to generate synthetic linked resource requests 506 (Block 916), the server stack 124 may forgo a synthetic linked resource request 506 for a client device 110 without push capability (Block 918).

Otherwise, the server stack 124 may generate a synthetic linked resource request 506, possibly in the kernel mode, in the user mode, or in firmware (Block 920). The server stack 124 may route the synthetic linked resource request 506 to a server application 122 associated with the linked resource 320 (Block 922). The server stack 124 may propagate the synthetic linked resource request 506 through the server stack 124 to the server application 122 (Block 924). The server stack 124 may apply a security protocol to the synthetic linked resource request 506 (Block 926). The server 120 may apply the security protocol at the server stack 124 or at the server application 122.

The server stack 124 may receive a linked resource 320 in response to the synthetic linked resource request 506 (Block 928). If the server stack 124 determines that the client device 110 is not push capable (Block 930), the server stack 124 may store a linked resource 320 in a server stack cache 126 in preparation for a subsequent linked resource request 406 from the client device 110 (Block 932). If the server stack 124 determines that the client device 110 is push capable (Block 930), the server stack 124 may push the linked resource 320 to the client device 110 as a pushed resource 452 (Block 934).

FIG. 10 illustrates, in a flow chart, one embodiment of a method 1000 of sending a data resource with linked resources 320 by a server application 122. The server application 122 may receive an initial navigation request 402 from the server stack 124 (Block 1002). The server application 122 may parse the initial navigation request 402 (Block 1004). The server application 122 may send the main resource 310 to the server stack 124 (Block 1006). If the requested main resource 310 has one or more linked resources 320 (Block 1008), the server application 122 may call a linked resource application programming interface call to alert the server stack 124 (Block 1010). The server application 122 may receive a linked resource request from the server stack 124 (Block 1012). The server application 122 may send the requested linked resource 320 to the server stack 124 (Block 1014).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
receiving in a server stack an active initial navigation request for a main resource;
receiving the main resource from a server application in response to the active initial navigation request;
detecting a linked resource referenced by the main resource of the active initial navigation request;
generating at the server stack a synthetic linked resource request for the linked resource; and
propagating the synthetic linked resource request through the server stack.

2. The method of claim 1,
wherein the main resource is at least one of a dynamic resource and a static resource.

3. The method of claim 1, further comprising:
receiving a linked resource application programming interface call alerting the server stack of the linked resource referenced by the main resource of the active initial navigation request.

4. The method of claim 1, further comprising:
generating the synthetic linked resource request at least one of a kernel mode and a user mode.

5. The method of claim 1, further comprising:
routing the synthetic linked resource request to an associated server application associated with the linked resource.

6. The method of claim 1, further comprising:
applying a security protocol to the synthetic linked resource request.

7. The method of claim 1, further comprising:
receiving the linked resource in response to the synthetic linked resource request.

8. The method of claim 1, further comprising:
detecting a push capability for a client device.

9. The method of claim 1, further comprising:
storing the linked resource in a server stack cache in preparation for a subsequent linked resource request.

10. The method of claim 1, further comprising:
pushing the linked resource to a client device.

11. A computing device having memory to store a set of instructions detailing a method stored thereon that when executed by one or more processors cause the one or more processors to perform the method, the method comprising:
- receiving an active initial navigation request for a main resource from a client device;
- promoting the active initial navigation request to a server application;
- receiving the main resource from the server application in response to the active initial navigation request; and
- receiving a linked resource application programming interface call alerting the server stack of a linked resource referenced by the main resource of the active initial navigation request.

12. The computing device of claim 11, wherein the method further comprises:
- detecting a push capability for the client device.

13. The computing device of claim 11, wherein the method further comprises:
- generating a synthetic linked resource request with a server stack; and
- propagating the synthetic linked resource request through the server stack to the server application.

14. The computing device of claim 11, wherein the method further comprises:
- forgoing a synthetic linked resource request for the client device without push capability.

15. The computing device of claim 11, wherein the method further comprises:
- storing the linked resource in a server stack cache in preparation for a subsequent linked resource request.

16. The computing device of claim 11, wherein the method further comprises:
- maintaining a linked resource list in a server stack cache.

17. The computing device of claim 11, wherein the method further comprises:
- pushing the linked resource to the client device.

18. A server, comprising:
- memory configured to store a main resource referencing a linked resource;
- a communication interface configured to receive an active initial navigation request for the main resource from a client device; and
- a processor configured to:
  - execute a server application configured to send the main resource in response to the active initial navigation request and to call a linked resource application programming interface to alert a server stack to the linked resource associated with the main resource, and
  - execute the server stack configured to generate a synthetic linked resource request in response to a linked resource application programming interface call alerting the server stack of the linked resource associated with the main resource of the active initial navigation request and to propagate the synthetic linked resource request through the server stack.

19. The server of claim 18, wherein the communication interface configured to receive an indication of a push capability for the client device.

20. The server of claim 18, further comprising:
- a server stack cache configured to store the linked resource in preparation for a subsequent linked resource request.

* * * * *